(12) United States Patent
Aubuchon

(10) Patent No.: US 11,725,767 B2
(45) Date of Patent: *Aug. 15, 2023

(54) HEAT RESISTANT HOSE

(71) Applicant: NORTH AMERICAN FIRE HOSE CORPORATION, Santa Maria, CA (US)

(72) Inventor: Michael S. Aubuchon, Pismo Beach, CA (US)

(73) Assignee: NORTH AMERICAN FIRE HOSE CORPORATION, Santa Maria, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/749,444

(22) Filed: May 20, 2022

(65) Prior Publication Data

US 2022/0275900 A1   Sep. 1, 2022

Related U.S. Application Data

(63) Continuation of application No. 17/139,651, filed on Dec. 31, 2020, now Pat. No. 11,339,908, which is a continuation of application No. 16/362,446, filed on Mar. 22, 2019, now Pat. No. 10,907,763.

(51) Int. Cl.
*F16L 57/04* (2006.01)
*F16L 11/02* (2006.01)

(52) U.S. Cl.
CPC .............. *F16L 57/04* (2013.01); *F16L 11/02* (2013.01)

(58) Field of Classification Search
CPC .......... F16L 11/02; F16L 57/04; F16L 11/086; F16L 11/087; D04C 1/12; D04B 1/225

USPC ........ 138/123–127, 137, 140, 141; 428/36.9, 428/36.91

See application file for complete search history.

(56) References Cited

U.S. PATENT DOCUMENTS

| | | | |
|---|---|---|---|
| 4,842,024 | A | 6/1989 | Palinchak |
| 5,183,079 | A | 2/1993 | Blin |
| 10,907,763 | B2 | 2/2021 | Aubuchon |
| 11,339,908 | B2 | 5/2022 | Aubuchon |

(Continued)

OTHER PUBLICATIONS

Aubuchon; U.S. Appl. No. 16/362,446, filed Mar. 22, 2019.

(Continued)

*Primary Examiner* — Patrick F Brinson
(74) *Attorney, Agent, or Firm* — Fitch, Even Tabin & Flannery LLP

(57) ABSTRACT

A heat resistant hose is described. The hose may include a first outer protective and structural woven reinforcing layer comprising a first tubular fabric structure, a second inner protective and structural woven reinforcing layer comprising a second tubular fabric structure, where the second inner protective and structural woven reinforcing layer is within the first outer protective and structural woven reinforcing layer, a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and an intermediate layer interposed between the first outer protective and structural woven reinforcing layer and the second inner protective and structural woven reinforcing layer, the intermediate layer comprising a fabric laminated with a reflective material.

22 Claims, 5 Drawing Sheets

(56) References Cited

U.S. PATENT DOCUMENTS

| | | |
|---|---|---|
| 2003/0098083 A1 | 5/2003 | Mizutani |
| 2005/0121095 A1 | 6/2005 | Ono |
| 2012/0125470 A1 | 5/2012 | Nanney |
| 2013/0167964 A1 | 7/2013 | Brettschneider |
| 2014/0326355 A1 | 11/2014 | Nonaka |
| 2015/0260328 A1 | 9/2015 | Colcombet |
| 2020/0300405 A1 | 9/2020 | Aubuchon |
| 2021/0123556 A1 | 4/2021 | Aubuchon |

OTHER PUBLICATIONS

Aubuchon; U.S. Appl. No. 17/139,651, filed Dec. 31, 2020.
USPTO; Notice of Allowance issued in U.S. Appl. No. 16/362,446 dated Sep. 30, 2020.
USPTO; Examiner Interview Summary issued in U.S. Appl. No. 17/139,651 dated Jan. 21, 2022.
USPTO; Notice of Allowance issued in U.S. Appl. No. 17/139,651 dated Jan. 21, 2022.

| | |
|---|---|
| TPU Layer |  |
| Adhesive Layer |  |
| Reinforcing Layer |  |
| Intermediate Layer |  |

| | |
|---|---|
| Rubber Layer |  |
| Adhesive Layer |  |
| Reinforcing Layer |  |
| Intermediate Layer |  |

HEAT RESISTANT HOSE

This application is a continuation of U.S. application Ser. No. 17/139,651, filed March Dec. 31, 2020, for HEAT RESISTANT HOSE, which in turn is a continuation of U.S. application Ser. No. 16/362,446, filed Mar. 22, 2019, for HEAT RESISTANT HOSE, now U.S. Pat. No. 10,907,763, which are incorporated in their entirety herein by reference.

BACKGROUND

The following relates generally to a hose for transporting liquid, and more specifically to a hose with radiant, conductive and convective heat resistance.

Hoses may be used for a variety of functions involving transporting liquid material from one location to another. In some cases, these hoses may be subject to extreme environmental conditions. For example, hoses used for extinguishing fires may be subject to high levels of heat. High heat levels and other environmental conditions may damage the hose, reduce the usable life of the hose, or render the hose unfit for its intended purpose.

SUMMARY

A heat resistant hose is described. The hose may include a first outer protective and structural woven reinforcing layer comprising a first tubular fabric structure, a first polyester or nylon warp yarn construction of the first outer protective and structural woven reinforcing layer, wherein each strand is oriented parallel to a longitudinal hose axis, a first polyester or nylon weft yarn construction of the first outer protective and structural woven reinforcing layer, wherein each strand is oriented circumferentially or helically relative to the longitudinal hose axis, a second inner protective and structural woven reinforcing layer comprising a second tubular fabric structure, a second polyester or nylon warp yarn construction of the second inner protective and structural woven reinforcing layer, wherein each strand is oriented parallel to a longitudinal hose axis, a second polyester or nylon weft yarn construction of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and an intermediate layer interposed between the first outer protective and structural woven reinforcing layer and the second inner protective and structural woven reinforcing layer, the intermediate layer comprising a fabric laminated with a reflective material.

A method of manufacturing a hose is described. The method may include providing a first outer protective and structural woven reinforcing layer comprising a first tubular fabric structure, providing a first polyester or nylon warp yarn construction of the first outer protective and structural woven reinforcing layer, wherein each strand is oriented parallel to a longitudinal hose axis, providing a first polyester or nylon weft yarn construction of the first outer protective and structural woven reinforcing layer, wherein each strand is oriented circumferentially or helically relative to the longitudinal hose axis, providing a second inner protective and structural woven reinforcing layer comprising a second tubular fabric structure, providing a second polyester or nylon warp yarn construction of the second inner protective and structural woven reinforcing layer, wherein each strand is oriented parallel to a longitudinal hose axis, providing a second polyester or nylon weft yarn construction of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, providing a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and providing an intermediate layer interposed between the first outer protective and structural woven reinforcing layer and the second inner protective and structural woven reinforcing layer, the intermediate layer comprising a fabric laminated with a reflective material.

In some examples of the hose and method described above, said intermediate layer comprises a reflective foil. In some examples of the hose and method described above, said intermediate layer comprises a tubular woven structure. In some examples of the hose and method described above, said intermediate layer comprises a flat woven structure formed into a tube and stitched with a sewn seam running along the length of the tube. In some examples of the hose and method described above, said intermediate layer comprises a flat non-woven structure formed into a tube and stitched with a sewn seam running along the length of the tube.

In some examples of the hose and method described above, said first outer protective and structural woven reinforcing layer comprises a tell-tale failure point indicator.

A heat resistant hose is described. The hose may include a first outer protective and structural woven reinforcing layer comprising a first tubular fabric structure, a first polyester or nylon warp yarn construction of the first outer protective and structural woven reinforcing layer, wherein each strand is oriented parallel to a longitudinal hose axis, a first polyester or nylon weft yarn construction of the first outer protective and structural woven reinforcing layer, wherein each strand is oriented circumferentially or helically relative to the longitudinal hose axis, a second inner protective and structural woven reinforcing layer comprising a second tubular fabric structure, a second highly heat resistant warp yarn of the second inner protective and structural woven reinforcing layer, wherein each strand is oriented parallel to a longitudinal hose axis, a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and an intermediate layer interposed between the first outer protective and structural woven reinforcing layer and the second inner protective and structural woven reinforcing layer, the intermediate layer comprising a fabric laminated with a reflective foil or other reflective material.

A method of manufacturing a hose is described. The method may include providing a first outer protective and structural woven reinforcing layer comprising a first tubular fabric structure, providing a first polyester or nylon warp yarn construction of the first outer protective and structural woven reinforcing layer, wherein each strand is oriented parallel to a longitudinal hose axis, providing a first polyester or nylon weft yarn construction of the first outer protective and structural woven reinforcing layer, wherein each strand is oriented circumferentially or helically relative to the longitudinal hose axis, providing a second inner protective and structural woven reinforcing layer comprising a second tubular fabric structure, providing a second highly heat resistant warp yarn of the second inner protective and structural woven reinforcing layer, wherein each strand is oriented parallel to a longitudinal hose axis, providing a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, providing a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and providing an intermediate layer interposed between the first outer protective and structural woven reinforcing layer and the second inner protective and structural woven reinforcing layer, the intermediate layer comprising a fabric laminated with a reflective foil or other reflective material.

In some examples of the hose and method described above, said first outer protective and structural woven reinforcing layer comprises a tell-tale failure point indicator.

In some examples of the hose and method described above, said second highly heat resistant warp yarn comprises strands that are wrapped in a yarn wrapping system. In some examples of the hose and method described above, said second highly heat resistant warp yarns are interlaced and intermingled with carded sliver fibers to form a friction spun/DREF yarn type. In some examples of the hose and method described above, said second highly heat resistant warp yarns are wrapped to form a core spun yarn type. In some examples of the hose and method described above, said second highly heat resistant warp yarns are wrapped to form a twisted composite yarn type. In some examples of the hose and method described above, said second highly heat resistant weft yarn comprises strands that are wrapped in a yarn wrapping system. In some examples of the hose and method described above, said second highly heat resistant weft yarns are interlaced and intermingled with carded sliver fibers to form a friction spun/DREF yarn type. In some examples of the hose and method described above, said second highly heat resistant weft yarns are wrapped to form a core spun yarn type. In some examples of the hose and method described above, said second highly heat resistant weft yarns are wrapped to form a twisted composite yarn type. In some examples of the hose and method described above, said second highly heat resistant, high modulus multifilament yarns are twisted to a high twist multiplier configuration, between 6 and 10 on the twist multiplier scale.

Some examples of the hose and method described above may further include a pair of longitudinal folding portions running the length of the heat resistant hose. Some examples of the hose and method described above may further include higher denier multifilament or higher cotton count spun individual warp yarns of said first polyester or nylon warp yarns at said folding portions. Some examples of the hose and method described above may further include a higher denier concentration or higher cotton count concentration of the combined warp yarns of said first polyester or nylon warp yarns at said folding portions only. Some examples of the hose and method described above may further include heavier denier or higher cotton count of the highly heat resistant warp yarns at said folding portions of the second inner protective and structural woven reinforcing layer. Some examples of the hose and method described above may further include a higher denier concentration or higher cotton count concentration of the highly heat resistant warp yarns at said folding portions of the second inner protective and structural woven reinforcing layer. Some examples of the hose and method described above may include spun and twisted, friction spun/DREF, Core-Spun, or a twisted Composite fiber yarn structure in the second inner protective and structural layer. Some examples of the hose and method described above may further include a thicker or heavier gauge elastomeric waterproofing material at said folding portions.

In some examples of the hose and method described above, said first outer protective and structural woven reinforcing layer comprises a liquid polymer-based coating or impregnating material formulation. In some examples of the hose and method described above, said liquid polymer-based coating or impregnating material formulation includes a flame resistant, a flame retardant, or an intumescent material. In some examples of the hose and method described above, said liquid polymer-based coating or impregnating material formulation includes a temperature sensitive thermo-chromatic pigment. In some examples of the hose and method described above, said liquid polymer-based coating or impregnating material formulation includes a reflective pigment. In some examples of the hose and method described above, said liquid polymer-based coating or impregnating material formulation includes a photo-luminescent pigment. In some examples of the hose and method described above, said liquid polymer-based coating or impregnating material formulation includes retro-reflective pigment.

In some examples of the hose and method described above, said second inner protective and structural woven reinforcing layer comprises a liquid polymer-based coating or impregnating material formulation. In some examples of the hose and method described above, said liquid polymer-based coating or impregnating material formulation includes a flame resistant, a flame retardant, or an intumescent material. In some examples of the hose and method described above, said liquid polymer-based coating or impregnating material formulation includes a reflective pigment.

A heat resistant hose is described. The hose may include a first outer protective and structural woven reinforcing layer comprising a first tubular fabric structure, a first highly heat resistant warp yarn of the first outer protective and structural woven reinforcing layer, wherein each strand is oriented parallel to a longitudinal hose axis, a first highly heat resistant weft yarn of the first outer protective and structural woven reinforcing layer, wherein each strand is oriented circumferentially or helically relative to the longitudinal hose axis, a second inner protective and structural woven reinforcing layer comprising a second tubular fabric structure, a second highly heat resistant warp yarn of the second inner protective and structural woven reinforcing layer, wherein each strand is oriented parallel to a longitudinal hose axis, a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and an intermediate layer interposed between the first outer protective and structural woven reinforcing layer and the second inner protective and structural woven reinforcing layer, the intermediate layer comprising a fabric laminated with a reflective foil or other reflective material.

A method of manufacturing a hose is described. The method may include providing a first outer protective and structural woven reinforcing layer comprising a first tubular fabric structure, providing a first highly heat resistant warp yarn of the first outer protective and structural woven reinforcing layer, wherein each strand is oriented parallel to a longitudinal hose axis, providing a first highly heat resistant weft yarn of the first outer protective and structural woven reinforcing layer, wherein each strand is oriented circumferentially or helically relative to the longitudinal hose axis, providing a second inner protective and structural woven reinforcing layer comprising a second tubular fabric structure, providing a second highly heat resistant warp yarn of the second inner protective and structural woven reinforcing layer, wherein each strand is oriented parallel to a longitudinal hose axis, providing a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, providing a hose innermost extruded waterproofing layer comprising an elastomeric material, the hose layer being bonded to, adhered to, or impregnated into or through the second protective layer, the innermost extruded waterproofing layer is within the inner protective and structural woven reinforcing layer, and providing an intermediate layer interposed between the first outer protective and structural woven reinforcing layer and the second inner protective and structural woven reinforcing layer, the intermediate layer comprising a fabric laminated with a reflective foil or other reflective material.

In some examples of the hose and method described above, said first outer protective and structural woven reinforcing layer comprises a tell-tale failure point indicator.

In some examples of the hose and method described above, said first highly heat resistant warp yarn comprises spun and twisted yarns. In some examples of the hose and method described above, said first highly heat resistant warp yarn comprises strands that are wrapped in a yarn wrapping system. In some examples of the hose and method described above, said first highly heat resistant warp yarns are interlaced and intermingled with carded sliver fiber to form a friction spun/DREF yarn type. In some examples of the hose and method described above, said first highly heat resistant warp yarns are wrapped to form a core spun yarn type. In some examples of the hose and method described above, said first highly heat resistant warp yarns are wrapped to form a twisted composite yarn type. In some examples of the hose and method described above, said first highly heat resistant weft yarn comprises strands that are wrapped in a yarn wrapping system. In some examples of the hose and method described above, said first highly heat resistant weft yarns are interlaced and intermingled with carded sliver fiber to form a friction spun/DREF yarn type. In some examples of the hose and method described above, said first highly heat resistant weft yarns are wrapped to form a core spun yarn type. In some examples of the hose and method described above, said first highly heat resistant weft yarns are wrapped to form a twisted composite yarn type. In some examples of the hose and method described above, said first highly heat resistant multifilament weft yarns are twisted together using a twist multiplier from 6 to 10.

In some examples of the hose and method described above, said second highly heat resistant warp yarn comprises spun and twisted yarns. In some examples of the hose and method described above, said second highly heat resistant warp yarn comprises strands that are wrapped in a yarn wrapping system. In some examples of the hose and method described above, said second highly heat resistant warp yarns are interlaced and intermingled with carded sliver fiber to form a friction spun/DREF yarn type. In some examples of the hose and method described above, said second highly heat resistant warp yarns are wrapped to form a core spun yarn type. In some examples of the hose and method described above, said second highly heat resistant warp yarns are wrapped to form a twisted composite yarn type. In some examples of the hose and method described above, said second highly heat resistant weft yarn comprises strands that are wrapped in a yarn wrapping system. In some examples of the hose and method described above, said second highly heat resistant weft yarns are interlaced and intermingled with carded sliver fiber to form a friction spun/DREF yarn type. In some examples of the hose and method described above, said second highly heat resistant weft yarns are wrapped to form a core spun yarn type. In some examples of the hose and method described above, said second highly heat resistant weft yarns are wrapped to form a twisted composite yarn type. In some examples of the hose and method described above, said first highly heat resistant multifilament weft yarns are twisted together using a twist multiplier from 6 to 10.

Some examples of the hose and method described above may further include a pair of longitudinal folding portions running the length of the heat resistant hose in the warp yarn direction. Some examples of the hose and method described above may further include higher denier or higher cotton count of individual warp yarns of said first highly heat resistant warp yarns at said folding portions. Some examples of the hose and method described above may further include a higher denier concentration or higher cotton count concentration of the combined warp yarns of said first highly heat resistant warp yarns at said folding portions. Some examples of the hose and method described above may further include higher denier or higher cotton count of the highly heat resistant warp yarns at said folding portions of the second inner protective and structural woven reinforcing layer. Some examples of the hose and method described above may further include a higher denier concentration or higher cotton count concentration of the highly heat resistant warp yarns at said folding portions of the second inner protective and structural woven reinforcing layer. Some examples of the hose and method described above may include spun and twisted, friction spun/DREF, Core-Spun, or a twisted Composite fiber yarn structure in the second inner protective and structural layer. Some examples of the hose and method described above may further include a thicker or heavier gauge, elastomeric waterproofing material at said folding portions.

In some examples of the hose and method described above, said first outer protective and structural woven reinforcing layer comprises a liquid polymer-based coating or impregnating material formulation. In some examples of the hose and method described above, said liquid polymer-based coating or impregnating material formulation includes a flame resistant, a flame retardant, or an intumescent material. In some examples of the hose and method described above, said liquid polymer-based coating or impregnating material formulation includes a temperature sensitive thermo-chromatic pigment. In some examples of the hose and method described above, said liquid polymer-based coating or impregnating material formulation includes a reflective pigment. In some examples of the hose and method described above, said liquid polymer-based coating or impregnating material formulation includes a photo-luminescent pigment. In some examples of the hose and method described above, said liquid polymer-based coating or impregnating material formulation includes retro-reflective pigment.

In some examples of the hose and method described above, said second inner protective and structural woven reinforcing layer comprises a liquid polymer-based coating or impregnating material formulation. In some examples of the hose and method described above, said liquid polymer-based coating or impregnating material formulation includes a flame resistant, a flame retardant, or an intumescent material. In some examples of the hose and method described above, said liquid polymer-based coating or impregnating material formulation includes a reflective pigment.

A heat resistant hose is described. The hose may include a first outer protective and structural woven reinforcing layer comprising a first tubular fabric structure, a first polyester or nylon warp yarn construction of the first outer protective and structural woven reinforcing layer, wherein each strand is oriented parallel to a longitudinal hose axis, a first polyester or nylon weft yarn construction of the first outer protective and structural woven reinforcing layer, wherein each strand is oriented circumferentially or helically relative to the longitudinal hose axis, a second inner protective and structural woven reinforcing layer comprising a second tubular fabric structure, a second polyester or nylon warp yarn construction of the second inner protective and structural woven reinforcing layer, wherein each strand is oriented parallel to a longitudinal hose axis, a second polyester or nylon weft yarn construction of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, an intermediate layer interposed between the first outer protective and structural woven reinforcing layer and the second inner protective and structural woven reinforcing layer, the intermediate layer comprising a fabric laminated with a reflective foil or other reflective material, a hose innermost extruded waterproofing layer comprising an elastomeric material, the hose layer being bonded to, adhered to, or impregnated into or through the second protective layer, and the innermost extruded waterproofing layer is within the inner protective and structural woven reinforcing layer, and where the hose innermost extruded waterproofing layer comprises a plurality of holes wherein the hose innermost extruded waterproofing later leaks, weeps, seeps or percolates in response to the heat resistant hose being pressurized.

A method of manufacturing a hose is described. The method may include providing a first outer protective and structural woven reinforcing layer comprising a first tubular fabric structure, providing a first polyester or nylon warp yarn construction of the first outer protective and structural woven reinforcing layer, wherein each strand is oriented parallel to a longitudinal hose axis, providing a first polyester or nylon weft yarn construction of the first outer protective and structural woven reinforcing layer, wherein each strand is oriented circumferentially or helically relative to the longitudinal hose axis, providing a second inner protective and structural woven reinforcing layer comprising a second tubular fabric structure, providing a second polyester or nylon warp yarn construction of the second inner protective and structural woven reinforcing layer, wherein each strand is oriented parallel to a longitudinal hose axis, providing a second polyester or nylon weft yarn construction of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, providing an intermediate layer interposed between the first outer protective and structural woven reinforcing layer and the second inner protective and structural woven reinforcing layer, the intermediate layer comprising a fabric laminated with a reflective foil or other reflective material, providing a hose innermost extruded waterproofing layer comprising an elastomeric material, the hose layer being bonded to, adhered to, or impregnated into or through the second protective layer, and the innermost extruded waterproofing layer is within the inner protective and structural woven reinforcing layer, and where the hose innermost extruded waterproofing layer comprises a plurality of holes wherein the hose innermost extruded waterproofing later leaks, weeps, seeps or percolates in response to the heat resistant hose being pressurized.

In some examples of the hose and method described above, said plurality of holes comprises a plurality of pricked holes. In some examples of the hose and method described above, said plurality of holes comprises a plurality of laser piercings. In some examples of the hose and method described above, said plurality of holes comprise a plurality of open cells formed with the addition of an open cell blowing agent. In some examples of the hose and method described above, said plurality of holes comprise small particle size thermoplastic polymer of a lower melt point than a base thermoplastic polyurethane or thermoplastic rubber matrix, wherein the holes open when the heat resistant hose is exposed to a temperature in excess of a threshold temperature.

A heat resistant hose is described. The hose may include a first outer protective and structural woven reinforcing layer comprising a first tubular fabric structure, a first highly heat resistant warp yarn of the first outer protective and structural woven reinforcing layer, wherein each strand is oriented parallel to a longitudinal hose axis, a first highly heat resistant weft yarn of the first outer protective and structural woven reinforcing layer, wherein each strand is oriented circumferentially or helically relative to the longitudinal hose axis, a second inner protective and structural woven reinforcing layer comprising a second tubular fabric structure, a second highly heat resistant warp yarn of the second inner protective and structural woven reinforcing layer, wherein each strand is oriented parallel to a longitudinal hose axis, a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, an intermediate layer interposed between the first outer protective and structural woven reinforcing layer and the second inner protective and structural woven reinforcing layer, the intermediate layer comprising a fabric laminated with a reflective foil or other reflective material, a hose innermost extruded waterproofing layer comprising an elastomeric material, the hose layer being bonded to, adhered to, or impregnated into or through the second protective layer, and the innermost extruded waterproofing layer is within the inner protective and structural woven reinforcing layer, and where the hose innermost extruded waterproofing layer comprises a plurality of holes wherein the hose innermost extruded waterproofing liner leaks, weeps, seeps or percolates in response to the heat resistant hose being pressurized.

A method of manufacturing a hose is described. The method may include providing a first outer protective and structural woven reinforcing layer comprising a first tubular fabric structure, providing a first highly heat resistant warp yarn of the first outer protective and structural woven reinforcing layer, wherein each strand is oriented parallel to a longitudinal hose axis, providing a first highly heat resistant weft yarn of the first outer protective and structural woven reinforcing layer, wherein each strand is oriented circumferentially or helically relative to the longitudinal hose axis, providing a second inner protective and structural woven reinforcing layer comprising a second tubular fabric structure, providing a second highly heat resistant warp yarn of the second inner protective and structural woven reinforcing layer, wherein each strand is oriented parallel to a longitudinal hose axis, providing a second highly heat resistant weft yarn of the second inner protective and structural woven reinforcing layer, wherein each strand is oriented circumferentially or helically relative to the longitudinal hose axis, the second inner protective and structural woven reinforcing layer is within the first outer protective and structural woven reinforcing layer, providing an intermediate layer interposed between the first outer protective and structural woven reinforcing layer and the second inner protective and structural woven reinforcing layer, the intermediate layer comprising a fabric laminated with a reflective foil or other reflective material, providing a hose innermost extruded waterproofing layer comprising an elastomeric material, the hose layer being bonded to, adhered to, or impregnated into or through the second protective layer, and the innermost extruded waterproofing layer is within the inner protective and structural woven reinforcing layer, and where the hose innermost extruded waterproofing layer comprises a plurality of holes wherein the hose innermost extruded waterproofing liner leaks, weeps, seeps or percolates in response to the heat resistant hose being pressurized.

In some examples of the hose and method described above, said plurality of holes comprises a plurality of pricked holes. In some examples of the hose and method described above, said plurality of holes comprises a plurality of laser piercings. In some examples of the hose and method described above, said plurality of holes comprise a plurality of open cells formed with the addition of an open cell blowing agent. In some examples of the hose and method described above, said plurality of holes comprise small particle size thermoplastic polymer of a lower melt point than a base thermoplastic polyurethane or thermoplastic rubber matrix, wherein the holes open when the heat resistant hose is exposed to a temperature in excess of a threshold temperature.

DETAILED DESCRIPTION

Figure 1:
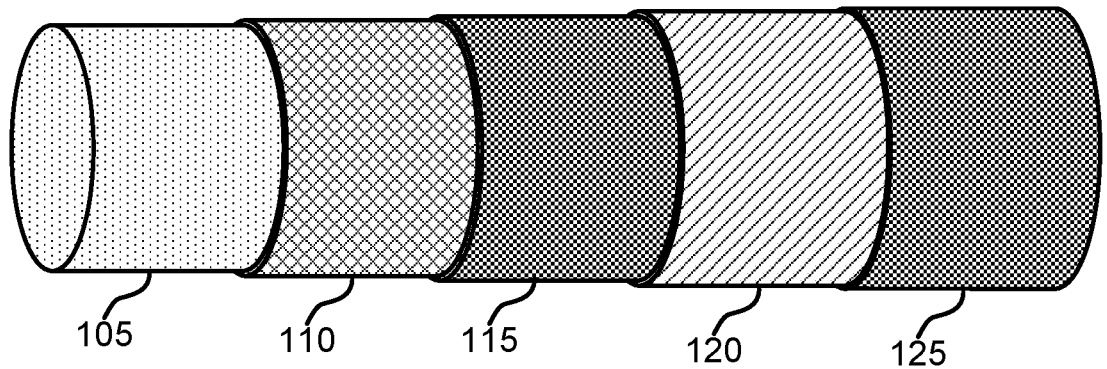
FIG. 1 shows an example of a hose with a thermoplastic polyurethane (TPU) innermost layer in accordance with aspects of the present disclosure.
Figure 1:
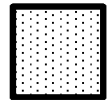
Figure 1:
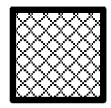
Figure 1:
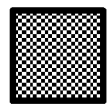
Figure 1:

A fire department attack hose, also referred to as a double jacket attack hose, may consist of the following three layers: be an outer high strength circular woven tubular reinforcing fabric layer, be an inner high strength circular woven tubular reinforcing fabric layer, and an inner elastomeric waterproofing layer.

The first layer may be an outer high strength circular woven tubular reinforcing fabric layer composed of a spun staple polyester warp yarn, a continuous filament polyester warp yarn, or a continuous filament nylon 66 warp yarn, with each warp yarn strand oriented parallel to the longitudinal hose axis, and which may be twisted or cabled, air-textured, entangled, or otherwise processed to create a cohesive yarn bundle; and a continuous filament polyester or continuous filament nylon weft yarn, with each weft yarn strand oriented in a circumferential or helical yarn arrangement, surrounding the longitudinal hose axis, and which is circular woven to form a continuous tubular structure. This outer high strength circular woven tubular reinforcing fabric layer may or may not be coated or impregnated with a colored polymer based liquid coating material, consisting of a polyurethane dispersion, an acrylic emulsion, a natural or synthetic rubber latex, or other similar polymer based liquid materials. The intent of this applied coating material may be to (a), improve and enhance the abrasion resistance of the woven outer reinforcing layer, (b), to reduce the water absorption of the woven outer reinforcing layer and complete hose assembly, (c), to improve the visibility of the complete hose assembly (yellow, white or other bright coating colors), which is important when the hose assembly is deployed in an outdoor environment such as a street at night, or when deployed in dark interior environments and (d), to provide color coding for identification purposes of the fire hose assembly.

The second layer may be an inner high strength circular woven tubular reinforcing fabric layer composed of a spun staple polyester, a continuous filament polyester or a continuous filament nylon 66 warp yarn, with each warp yarn strand oriented parallel to the longitudinal hose axis, and which may be twisted or cabled, air-textured, entangled, or otherwise processed to create a cohesive yarn bundle, and a continuous filament polyester or continuous filament nylon weft yarn, with each weft yarn strand oriented in a circumferential or helical yarn arrangement, surrounding the longitudinal hose axis, which is woven to form a continuous tubular woven structure, and which is normally uncoated.

The third layer may be an inner elastomeric waterproofing material that may be composed of either a vulcanized rubber liner, a TPU liner, or other elastomeric waterproofing material produced by an extrusion process, with said inner waterproofing tubular material being bonded or adhered to the inner high strength circular woven tubular reinforcing fabric layer with either a vulcanized rubber backing layer, a hot melt adhesive layer, or by direct bonding the waterproofing inner liner to the innermost high strength circular woven reinforcing fabric layer. Another waterproofing method includes incorporating a through-the-weave extrusion process to encapsulate the inner reinforcing fabric layer with a vulcanized rubber, thermoplastic polyurethane, or other elastomeric waterproofing material.

The purpose of these three layers is as follows: first, the outer high strength circular woven tubular reinforcing fabric layer is designed to contain the high levels of static and dynamic hydraulic pressure contained within the hose assembly during hose testing and in-service conditions, as well as to protect the other components from the effects of heat exposure, cutting, abrasion and other external environmental factors that may damage the inner high strength circular woven tubular reinforcing fabric layer described above, as well as the inner elastomeric waterproofing material described above; second, the inner high strength circular woven tubular reinforcing fabric layer is designed to contain the high levels of static and dynamic hydraulic pressure contained within the hose assembly during hose testing and in-service conditions and also contributes significantly to achieve the primary burst pressure capability of the overall hose construction; and third, the inner elastomeric waterproofing material layer which contains the liquid fire extinguishing media within the inner high strength circular woven tubular reinforcing fabric layer and completed hose assembly. This liquid fire extinguishing media may include water, water with a foam inducing agent, or other liquid fire extinguishing materials.

In some cases, the waterproofing inner lining may or may not be designed to demonstrate a capability to leak, weep, seep or percolate water, water with a foam inducing agent, or other liquid fire extinguishing materials to the surface of the hose assembly when pressurized, thereby providing an additional thermal absorption capability by either direct cooling and/or evaporative cooling effects, in order to preserve the hose assembly structural integrity when subjected to extreme heat exposure and other firefighting conditions. Presently, this weeping, leaking or seeping capability is created by piercing the waterproofing inner lining with a pinned piercing device, or by weaving a special warp yarn in various locations around the circumference of the hose.

The inner or outer reinforcing layers may comprise either organic or inorganic material. Synthetic organic and natural fibers may have the following two characteristics: a melt point (MP) of 350 degrees C./662 degrees F. or greater (including synthetic organic and natural fibers that exhibit no melt point), and a Limiting Oxygen Index (LOI) greater than or equal to 25 (i.e., the environment must have an oxygen content of 25% or greater in order for the fiber to burn). Inorganic fibers may exhibit the following two characteristics: a melt point (MP) of 1000 degrees C. or greater, and a Limiting Oxygen Index (LOI) of 100 (this means that the environment must have an oxygen content of 100% in order for the fiber to burn).

Examples of Synthetic organic and natural fibers that meet criteria A: meta-aramid (Nomex, Conex, etc.), para-aramid (Kevlar, Twaron, Technora), PBI, PBO (Zylon), Polyimid (P84), Melamine Formaldehyde (Basofil), Modacrylic/Acrylic Co-polymer (Protex), Polyacrylate (Pyrotex), Polyacrylate co-polymer super absorbent (Oasis), PTFE (Teflon), Polyetherimide/PEI (Ultem), Novaloid (Phenolic), Oxidized PAN (Panox), Carbon (Panex), Cotton FR, Viscose Rayon (Lenzing FR)— Many of these fibers are blended together in spun and twisted, multifilament twisted, friction spun/DREF, core spun and twisted composite yarn constructions to maximize properties and reduce cost. Examples of Inorganic fiber that meet criteria B: Stainless Steel (Bekinox), D and E Glass (Fiberglass), Basalt—note that these inorganic materials may be difficult to process and may experience other limitations in these applications.

In a first embodiment, in addition to the outer and inner circular woven reinforcing layers, an intermediate layer inserted between the outer and inner circular woven reinforcing layers shall consist of a light weight woven fabric or non-woven fabric layer laminated with a reflective foil or other similar reflective material layer. This intermediate layer inserted between the outer and inner circular woven reinforcing layers shall function primarily to reflect a significant amount of radiant heat energy away from the inner high strength circular woven tubular reinforcing fabric layer, as well as the inner waterproofing elastomeric material produced by an extrusion process, and also to protect the critical adhesive bond, direct bond, or through-the-weave bond, thereby providing radiant heat damage protection for these components. The intermediate layer inserted between the outer and inner circular woven reinforcing layers as referenced above will also provide additional insulation protection to the inner high strength circular woven tubular reinforcing fabric layer, as well as the inner waterproofing elastomeric material produced by an extrusion process, thereby further reducing damage from conductive and convective heat effects.

The intermediate layer inserted between the outer and inner circular woven reinforcing layers shall consist of a light weight woven fabric or non-woven fabric layer laminated with a reflective foil or other similar reflective material layer, and may be composed of either a tubular woven structure, or may be assembled from flat woven fabric backed foil or other reflective material laminate, or from flat non-woven fabric backed foil or reflective material laminate, which is converted to a stitched tube with a sewn seam running along the longitudinal axis of the stitched tubular structure.

In the basic version of the first embodiment, the primary purpose of the outer reinforcing high strength circular woven tubular fabric layer is to protect the intermediate radiant heat reflective foil and scrim fabric layer, the inner high strength circular woven tubular reinforcing fabric layer, and the inner elastomeric waterproofing material layer from damage due to cutting, abrasion, snagging or other wear conditions, as well as protecting these components from Ultra-Violet light, all of which may damage and compromise the pressure and heat resistance capability of these layers. It may consist of a conventional outer reinforcing high strength circular woven tubular fabric layer composed of a spun staple polyester or continuous filament polyester or continuous filament nylon warp yarn along the longitudinal axis, which may be twisted, air-textured or otherwise processed to create a cohesive yarn bundle, and a continuous filament polyester or continuous filament nylon weft yarn or circumferential yarn, which is woven to form a continuous tubular woven structure, and with said outer reinforcing layer that may or may not be coated or impregnated with a colored polymer based coating material consisting of polyurethane dispersion, acrylic emulsion, synthetic rubber latex, or other similar polymer based materials, in order to reduce water absorption by the completed fire hose structure, to improve and enhance abrasion resistance of the fire hose, to increase the visibility of the hose, especially when deployed in an outdoor environment at night or in other dark interior environments (yellow, white, other light or bright colored pigments), or for other color-coded identification purposes. Therefore, the outer reinforcing high strength circular woven tubular fabric layer may maintain a normal function for a conventional outer reinforcing high strength circular woven tubular fabric layer.

Describing another feature of this basic version of the first embodiment, the outer reinforcing high strength circular woven tubular fabric layer, which is not protected from higher levels of radiant, conductive or convective heat damage due to the position of the intermediate reflective layer below and underneath the outer circular woven reinforcing layers, said outer reinforcing high strength circular woven tubular fabric layer may provide an additional function to indicate when the hose assembly has been exposed to extreme short term, or severe long term radiant, conductive and/or convective heat exposure, thereby providing a visual indicator or "tell-tale" function that the hose assembly should be removed from service and replaced. This visual indicator or "tell-tale" function may be observed as melting, charring or burning of the outer reinforcing high strength circular woven tubular fabric layer, thereby indicating that the longer term structural integrity of the hose assembly has been compromised as a result of severe thermal trauma to the hose assembly as a whole, and to the various individual components of the hose assembly.

In a second embodiment, the warp yarn fiber material for the outer high strength circular woven tubular reinforcing fabric layer, and/or the inner high strength circular woven tubular reinforcing fabric layer may be composed of the following fiber types and classes, with major trade names listed, although other tradenames are commercially available: Kevlar®, or Technora® (para-aramid); Nomex® or Conex® (meta-aramid); Spectra® or Dyneema® (High Density Polyethylene); P-84™ (co-polyimide); Vectran® (Polyarylate); Zylon® PBO (poly-p-phenylenebenzobisaxazole); PBI Gold® (polybenzimiazole); Torcon® or Axxel® (Polyphenylene Sulfide); Basofil R (melamine formaldehyde); Dolanit® (Homopolymer Acrylic); Protex® (Modacrylic); Teflon® (Polytetrafluroethylene); Rhoyvl FR® (PVC); ULTEM® (Polyetherimide); Kynol™ (phenol); Zyex® ((Polyetheretherketone); Panex® (Carbon); Basalt; Fiberglass; or other high strength, highly heat resistant single fiber yarn or a blend of multiple fiber types thereof. This warp yarn can be composed of the following yarn structures: 1, spun and twisted multiple plied staple single fiber or multi fiber blend yarns, 2, multifilament twisted single fiber yarns, 3, composite yarns composed of two or more different polymer types in a sheath-core, or a side-by-side (bilateral) relation, 4, friction spun/DREF yarns, typically composed of a multifilament core yarn, with a carded and drafted sliver of staple fiber of either the same or a different fiber type, which is interlaced or intermingled into the multifilament core, 5, a hybrid multifilament twisted combination of two or more different fiber types, such as Kevlar® and polyester, Kevlar® and nylon 66, or another combination of two or more multi-filament yarn types, or 6, a core spun yarn, formed by twisting or wrapping fibers around a multifilament or spun yarn core, thus concealing the core with the wrapping yarns.

The weft yarn fiber material for the outer high strength circular woven tubular reinforcing fabric layer, and/or the inner high strength circular woven tubular reinforcing fabric layer may be composed of the following fiber types and classes, with major trade names listed, although other tradenames are commercially available: Kevlar®, or Technora® (para-aramid); Nomex® or Conex® (meta-aramid); Spectra® or Dyneema® (High Density Polyethylene); P-84™ (co-polyimide); Vectran® (Polyarylate); Zylon® PBO (poly-p-phenylenebenzobisaxazole); PBI Gold® (polybenzimiazole); Torcon® or Axxel® (Polyphenylene Sulfide); Basofil® (melamine formaldehyde); Dolanit® (Homopolymer Acrylic); Protex® (Modacrylic); Teflon® (Polytetrafluroethylene); Rhoyvl FR® (PVC); ULTEM® (Polyetherimide); Kynol™ (phenol); Zyex® ((Polyetheretherketone); Panex® (Carbon); Basalt; Fiberglass; or other high strength, high heat resistance single fiber yarn materials, or a blend thereof. This weft yarn can be composed of the following yarn structures: 1, multi-filament twisted single fiber yarns, 2, composite yarns composed of two or more different polymer types in a sheath-core, or a side-by-side (bilateral) relation, 3, friction spun/DREF yarn, typically composed of a multi-filament core yarn, with a carded and drafted sliver of staple fiber of either the same or a different fiber type, interlaced or intermingled into the multi-filament core yarn, 4, a hybrid twisted multi-filament combination of two or more different fiber types, such as Kevlar® and polyester, Kevlar® and nylon 66, or another combination of two or more multi-filament yarn types, or 5, a core spun yarn, formed by twisting or wrapping fibers around a multifilament or spun yarn core, thus concealing the core with the wrapping yarns.

In a third embodiment, the warp and/or weft yarn of the outer and/or the inner high strength circular woven tubular reinforcing fabric layer is composed of: 1, a modified composite yarn structure, specifically being assembled as a composite yarn having a central axis core of multi-filament yarn which is covered or wrapped with a spun staple yarn composed of either the same or a different fiber type from the core yarn, or 2, a friction spun/DREF yarn, consisting of a multifilament core yarn, with a carded and drafted sliver of staple fiber composed of either the same or a different fiber type from the core yarn, and interlaced and intermingled into the multi-filament core. In both of the examples of yarn structure described above, the covered or wrapped, or interlaced and intermingled staple yarn layer will protect the multi-filament core warp yarn, and the multifilament core weft yarn tensile strength members, such as Kevlar®, fiberglass, or other multi-filament fibers, by providing a protective physical barrier layer, separation layer, chaffing prevention layer, or a sacrificial fiber layer in order to protect the core weft yarn from various types of fatigue, including flex fatigue (compression, or a combination of compression and abrasion), and from cross fiber abrasion fatigue with the warp yarn.

The composite yarn covering or wrapping staple fiber, or the friction spun/DREF yarn interlaced and intermingled with a carded and drafted sliver of staple fiber, may consist of a highly temperature resistant, normal abrasion resistant, and lower tenacity staple fiber including Nomex®, PBI Gold®, Teflon®, or other similar staple yarns, thereby maintaining the heat resistant characteristics of the present invention while also taking advantage of the highly heat resistant, high tenacity core yarn, such as Kevlar, fiberglass, or other similar multifilament fibers. Alternately, the composite yarn covering or wrapping staple fiber, or the friction spun/DREF yarn interlaced or intermingled with a carded and drafted sliver of staple fiber, may consist of a normal temperature resistance, normal abrasion resistance, and/or a normal high tenacity staple fiber, including standard polyester, nylon 66, or other common staple fibers, while also taking advantage of the highly heat resistant, high tenacity core yarn, such as Kevlar, fiberglass, or other multifilament fibers. In this manner, the characteristics of the fiber may be adjusted and modified to achieve specific yarn properties using the large variety of fiber types available to the market.

One reason for the third embodiment is to overcome known and serious adverse phenomena that many highly heat resistant, high tenacity, high modulus and/or highly oriented multifilament yarns, such as Kevlar®, Spectra®, Vectran®, Zylon®, fiberglass, and others experience when incorporated as a warp and/or weft yarn, especially in a load bearing structure such as fire hose. In general, these types of fibers typically exhibit poor fatigue resistance, including flex fatigue, abrasion fatigue, or tension-tension fatigue as mentioned previously. Flex fatigue is the result of compression, or compression and abrasion, which occurs when the yarn is subjected to repeated flexing or bending over a given radius. The most damaging type of flex fatigue results from compression of the fiber, as well as when compression and abrasion occur at the same time. This circumstance exists in all fire hose constructions due to the crimp forces applied to both the warp and weft yarn, and which is inherent due to the weaving process and fabric structure. This flex fatigue phenomenon is also present amplified in all weft yarn for the following reasons. During the circular weaving process, the fabric is pulled from the circular weaving loom under tremendous tension, as well as being subjected to a high level of pressure which is exerted by the take-off rolls of the loom during the weaving process, thereby flattening and sharply creasing the previously circular configuration of the woven fabric along two folds, located 180 degrees apart, as the woven fabric exits the loom. These two folds are permanent in nature and exist for the life of the hose. Conversely, when the hose is pressurized, the cross-section becomes round, with the creases or folds are no longer present. Then, upon discharging the pressure and flattening the folds of the hose again, which occurs in the same locations 180 degrees apart in the hose construction, the weft yarns in the folded area again are returned to the compressed configuration. With many highly heat resistant, high tenacity, high modulus and/or highly oriented multi-filament yarns, such as Kevlar®, Spectra®, Vectran®, Zylon®, fiberglass, as well as others, the normal folding and compression stresses that occur along the two folds or lay-flat edges of the unpressurized hose, which are then flexed again during pressurization of the hose assembly, will lead to a significant reduction of weft yarn tensile strength with time and repeated cycles of pressurization/depressurization due to the effects of flex fatigue. This reduction of pressure capability for the completed hose assembly, due to the loss of weft yarn tensile strength, is not evident unless a destructive burst pressure test is conducted on the complete hose assembly.

As these fibers also exhibit only fair to poor inherent abrasion fatigue resistance, they are therefore subject to cross-fiber abrasion damage at the interstices of the woven structure, where there is perpendicular, tangential rubbing contact with the multi-filament or spun staple warp yarn, and the weft yarn. This cross-fiber abrasion fatigue is the result of the cyclical and repeated increase and release of internal pressure within the hose assembly, creating a perpendicular, tangential sawing or cutting action as both the warp and weft yarns elongate under pressure, and relax and recover due to the elastic recovery properties of the yarn when de-pressurized. Also, there is additional tension-tension fatigue, occurring when the internal molecular and crystalline structure is subjected to pull-pull type fatigue action, which can occur when the pressure within the hose is varied. These phenomena have been demonstrated to reduce the pressure capability of the hose assembly following a limited number of pressurization and depressurization cycles, resulting in reduced functionality of the fire hose assembly. The loss of warp and/or weft yarn strength results in a loss of pressure capability for the hose assembly, including: reduced burst pressure, reduced acceptance or proof pressure, reduced service test pressure, and reduced normal highest operating pressure capability due to the reduction of the warp yarn strength, and the resulting reduction of end force load bearing capability, and the reduction of the weft yarn strength, and the resulting reduction of hoop force load bearing capability of the reinforcing yarns. This loss of warp and weft yarn tensile strength is not evident by physical examination of the fire hose assembly and requires that a destructive burst pressure test be conducted in order to determine the degree of this loss of pressure capability.

In order to minimize or eliminate this loss of weft yarn tensile strength due to the normal folding and compression stresses that occur along the two folds or lay-flat edges of the woven jacket and the completed hose assembly, the third embodiment may incorporate one or more of the following: 1, a composite yarn construction having a central axis core of multifilament yarn, which is covered or wrapped with a staple fiber yarn composed of either the same or a different fiber from the core yarn, 2, the friction spun/DREF yarn construction, consisting of a multi-filament core yarn, with a carded and drafted sliver of staple fiber composed of either the same or a different fiber from the core yarn, and inter-laced or inter-mingled into the multi-filament core, and 3, increasing the twist level or twist multiplier of the multifilament twisted yarn, to a twist multiplier level in the range of 6 to 10. Any of these three weft yarn structures, whether incorporated independently or in combination, would reduce or minimize the folding and compression stresses that occur along the two folds or lay-flat edges of the woven fabric jackets, as well as the completed hose assembly, when compared to a conventionally twisted, low twist multiplier multifilament yarn. The present invention achieves a significant improvement because the modified yarn cross-section created with the above described composite weft yarn structure, the friction spun/DREF weft yarn forming processes, or with the increased twist level or twist multiplier of the multifilament twisted yarn structure, increases the stiffness and rigidity of the weft yarns, as well as reducing the severity and degree of the sharp bending and compression forces in the locations where yarn crimping and folding occur, thereby also reducing or eliminating the associated loss of strength due to the normal folding and compression stresses, and fatigue resistance problems noted above.

Another improvement to the third embodiment may be affected by increasing the total denier of the multi-filament core weft yarn, thereby increasing the overall yarn diameter and yarn denier, as well as increasing the torsional stiffness and structural rigidity of the weft yarn bundle. This would also further reduce and minimize the severity and degree of the sharp, permanent creases that form along the two folds or lay-flat edges of the woven lay-flat jacket during the weaving process, therefore also reducing or eliminating the associated loss of strength due to the normal folding and compression stresses.

Further improvements to minimize the flattening and creasing of the woven reinforcing inner fabric layer can be effected by modifying the design of the inner elastomeric waterproofing material which may be composed of either a vulcanized rubber liner, a thermoplastic polyurethane liner, or other elastomeric waterproofing material produced by an extrusion process, with said inner waterproofing tubular material being bonded or adhered to the inner high strength circular woven tubular reinforcing fabric layer with either a vulcanized rubber backing layer, a hot melt adhesive layer, or by direct bonding the waterproofing inner liner to the innermost high strength circular woven reinforcing fabric layer, or another waterproofing method which includes incorporating a through-the-weave extrusion process to encapsulate the inner reinforcing fabric layer with a vulcanized rubber, a thermoplastic polyurethane, or other elastomeric waterproofing material. These modifications may include one or more of the following features: 1, increase the radius along the two folds or lay-flat edges of the inner elastomeric waterproofing liner during the extrusion and curing process if curing or vulcanization is required, 2, increasing the gauge or thickness of the inner elastomeric waterproofing liner along and adjacent to the two folds or lay-flat edges only, such as by using a modified extrusion pin and die that generates a heavier inner elastomeric waterproofing liner along the two folds or lay-flat edges of the liner, 3, by increasing the total gauge or thickness of the inner elastomeric waterproofing liner equally around the entire cross-section of the inner elastomeric waterproofing liner, 4, by increasing the durometer hardness of the inner elastomeric waterproofing liner, and 5, increasing the total denier, total yarn count, or total number of warp ends present around the circumference of the jacket. Item 5 above is even more effective if additional warp ends are concentrated in the two normal folds or lay-flat edges of a given construction.

In a fourth embodiment of the current invention, the outer circular woven reinforcing high strength tubular fabric layer may be coated or impregnated with a liquid polymer-based material, which may incorporate a flame resistant, flame retardant, or intumescent functionality, or any combination of these three components as a result of incorporating specific additive materials to the basic coating formulae. A flame resistant or flame retardant coating additive would inhibit, suppress, or delay the production of flames to prevent the spread of fire along the hose assembly. An intumescent functional material would swell or expand as a result of heat exposure, thus increasing in volume and decreasing in density, and thereby insulating the base material from heat and minimizing the associated heat damage. These flame resistant, flame retardant, and/or intumescent functional coating additives would therefore improve the intensity and duration of thermal trauma that the hose assembly will withstand without rupturing or bursting, thereby protecting the capability of the hose assembly to provide fire extinguishing fluids to the fire.

A further refinement of this fourth embodiment of the current invention may be to incorporate a temperature sensitive, reversible thermo-chromatic pigment or dye into the colored polymer based coating material applied to the outer reinforcing high strength circular woven tubular fabric layer, which would change color temporarily from the initial color only while exposed to a given threshold level or greater of elevated temperature, and thereafter reverting to the original color following removal of the coated fire hose assembly from the elevated temperature environment. This change in color could give firefighting personnel critical immediate feedback concerned with reaching a particular threshold temperature in the fire environment, thereby providing these personnel an opportunity to abandon their position and retreat to a safer thermal environment before sustaining burn and other heat related injuries or death. This refinement also provides an opportunity through coating re-formulation or through the selection of a different reversible thermo-chromatic pigment or dye, to adjust or modify the threshold temperature level where this reversible color change occurs.

Another refinement of this fourth embodiment of the current invention may be to incorporate a temperature sensitive, irreversible thermo-chromatic pigment or dye into the colored polymer based coating material applied to the outer reinforcing high strength circular woven tubular fabric layer, which would change color from the initial color, permanently and irreversibly to a different color following exposure to a given threshold or triggering level of elevated temperature, thereafter maintaining the changed color after removal of the coated fire hose assembly from the elevated temperature environment. This permanent color change would give firefighting personnel the opportunity to inspect or remove from service fire hose assemblies that may not be visibly damaged from a high or extreme level of thermal exposure, but which may have experienced structural damage, resulting in reduced pressure capability of the hose assembly. Also, this change in color could give firefighting personnel critical immediate feedback concerned with reaching a particular threshold temperature in the fire environment, thereby providing firefighting personnel an opportunity to abandon their position and retreat to a safer thermal environment before sustaining burn and other heat related injuries or death. This refinement also provides an opportunity through coating re-formulation or through the selection of a different irreversible thermo-chromatic pigment or dye, to adjust or modify the threshold temperature level where this irreversible color change occurs.

Another refinement of this fourth embodiment of the current invention may be to incorporate a highly reflective, bright white pigment, such as Titanium Dioxide or similar material, or a silver colored or highly reflective metallic pigment, such as an Aluminum based or other metallic reflective pigment type, into the polymer based coating material in order to reflect damaging radiant heat energy away from the hose outer and inner jacket structure, as well as the inner elastomeric waterproofing material, in order to better protect these components from radiant heat damage. This refined reflective coating could be applied to the outer reinforcing high strength circular woven tubular fabric layer only, to the inner reinforcing high strength circular woven tubular fabric layer only, or to both the inner and outer reinforcing high strength circular woven tubular fabric layers.

Another refinement of the present invention may be to incorporate a photo-luminescent pigment into the polymer based coating or impregnating material applied to the outer reinforcing high strength circular woven tubular fabric layer, thereby absorbing available light energy and storing it within the pigment structure, which is then emitted as visible light when the coated hose assembly is introduced to a darkened environment. This photo-luminescent characteristic could provide the firefighter with a defined means of egress from a hazardous environment by following the hose line should rapid evacuation be necessary, and by tracing the path of the hose out of the structure and towards the fire engine to which it is connected. This characteristic would also reduce the tripping hazard obstacle created by the presence of a charged or pressurized hose assembly, especially in a darkened environment.

Another refinement of the fourth embodiment of the current invention may be to combine retro-reflective pigments into the polymer based coating or impregnating material applied to the outer reinforcing high strength circular woven tubular fabric layer, thereby reflecting available ambient and/or artificial light source, such as from a portable flashlight, permanent street or structural lighting, or motor vehicle head lights, and which would also provide the firefighter with a defined means of egress from a hazardous environment by following the hose line should rapid evacuation be necessary, by tracing the path of the hose out of the structure and towards the fire engine to which it is connected.

In addition, the incorporation of a retro-reflective pigment material into the polymer based coating or impregnating material applied to the outer reinforcing high strength circular woven tubular fabric layer would also function to reflect damaging radiant heat energy away from the outer reinforcing high strength circular woven tubular fabric layer, thereby reducing radiant heat damage to the hose assembly.

One or more of the above mentioned fourth embodiment coating refinements may be incorporated into a single hose assembly, including: 1, a flame resistant, flame retardant, or intumescent functional materials, 2, incorporating a temperature sensitive, reversible thermo-chromatic pigment or dye into the colored polymer based coating material, 3, incorporating a temperature sensitive, irreversible thermo-chromatic pigment or dye into the colored polymer based coating material, 4, a highly-reflective metallic pigment, such as Aluminum based or other metallic reflective pigment type, into the polymer based coating material, 5, incorporating a photo-luminescent pigment into the polymer based coating or impregnating material, or 6, incorporating a retro-reflective pigment into the polymer based coating or impregnating material, thereby increasing the range of additional protection available with variations to the coating formulation.

The fifth embodiment of the current invention includes an improved controlled leaking, weeping, seeping or percolating feature which may occur whenever the hose is pressurized or charged, or only when the hose has achieved a high threshold level of thermal exposure or assault only. In either case, the controlled leaking, weeping or seeping of water, water with a foam inducing agent, or other liquid fire extinguishing materials to the surface of the hose assembly when pressurized, provides an additional thermal absorption capability by either direct cooling and/or evaporative cooling effects, in order to preserve the hose assembly structural integrity when subjected to extreme heat exposure, burning brands or embers, and other firefighting conditions.

In the first refinement of the fifth embodiment of the current invention, whereby the hose leaks, weeps, seeps or percolates water, water with a foam inducing agent, or other liquid fire extinguishing materials to the surface of the hose assembly whenever the hose is pressurized or charged, the leakage, weeping or seepage is created by either a pin-pricking or piercing device, or by a laser piercing process. This pin-pricking or laser piercing of the inner elastomeric waterproofing material that may be composed of either a vulcanized rubber liner, a TPU liner, a TPR liner, or other elastomeric waterproofing material produced by an extrusion process, and may occur either before or after bonding the elastomeric waterproofing material to the inner reinforcing high strength circular woven tubular fabric layer.

In a second refinement of the fifth embodiment of the current invention, the controlled leaking, weeping, seeping or percolating characteristic is created by incorporating an open cell blowing agent into the inner elastomeric waterproofing material that may be composed of either a thermosetting rubber liner, a thermoplastic polyurethane liner, a TPR liner, or other elastomeric waterproofing material produced by an extrusion process before bonding the elastomeric waterproofing material to the inner reinforcing high strength circular woven tubular fabric layer. The cells created by the open cell blowing agent forms a network or pathway of interconnected gas bubbles that will convey water, water with a foam inducing agent, or other liquid fire extinguishing materials to the surface of the hose assembly whenever the hose is pressurized or charged.

In a third refinement of the fifth embodiment of the current invention, the hose will exhibit controlled weeping, seeping or leaking only after a specific threshold level of thermal exposure or assault is achieved, thereby minimizing the loss of water to the surface of the hose assembly and delivering it to the end of the fire hose and/or nozzle in order to perform the primary function of extinguishing the fire. This is achieved with a thermoplastic polyurethane liner, a TPR liner, or other elastomeric waterproofing material by precisely dispersing a small amount of a lower melt point, small particle size polymer within the higher melt point base polymer, which will allow the lower melt point, small particle size polymer to melt at a lower temperature than the base polymer, thereby causing a controlled weeping, leaking, seeping or percolating effect on the surface of the hose and only in the area of the hose that is experiencing an elevated level of thermal exposure or assault.

Now refer specifically to FIG. 1, which shows an example of a hose 100 with a thermoplastic polyurethane (TPU) innermost layer 105 in accordance with aspects of the present disclosure. Hose 100 may include innermost layer 105, adhesive layer 110, inner reinforcing layer 115, intermediate layer 120, and outer reinforcing layer 125.

Hose 100 may also include additional composite yarn or friction spun/(DREF) yarn at one or more folding portions. Hose 100 may also be an example of an increased thickness or gauge of elastomeric waterproofing material at said folding portions. Hose 100 may be an example of, or include aspects of, the corresponding elements described with reference to FIG. 2.

Innermost layer 105 may be an example of a hose innermost extruded waterproofing layer comprising an elastomeric material, the hose layer being bonded to, adhered to, or impregnated into or through the second protective layer. In some examples, the innermost extruded waterproofing layer is within the inner protective and structural woven reinforcing layer.

In some examples, the innermost extruded waterproofing layer is within the inner protective and structural woven reinforcing layer, and where the hose innermost extruded waterproofing layer comprises a plurality of holes wherein the hose innermost extruded waterproofing later leaks, weeps, seeps or percolates in response to the heat resistant hose 100 being pressurized. In some examples, said plurality of holes comprises a plurality of pricked holes. In some examples, said plurality of holes comprises a plurality of laser piercings. In some examples, said plurality of holes comprise a plurality of open cells from an open cell blowing agent. In some examples, said plurality of holes comprise small particle size thermoplastic polymer of a lower melt point than a base thermoplastic polyurethane or thermoplastic rubber matrix, wherein the holes open when the heat resistant hose 100 is exposed to a temperature in excess of a threshold temperature. Innermost layer 105 may be an example of, or include aspects of, the corresponding elements described with reference to FIG. 2.

Adhesive layer 110 may be an example of, or include aspects of, the corresponding elements described with reference to FIG. 2.

Inner reinforcing layer 115 may be an example of a second inner protective and structural woven reinforcing layer comprising a second tubular fabric structure. Inner reinforcing layer 115 may also comprise a second polyester or nylon warp yarn construction, wherein each strand is oriented parallel to a longitudinal hose axis. Inner reinforcing layer 115 may also comprise a second polyester or nylon weft yarn construction, wherein each strand is oriented circumferentially or helically relative to the longitudinal hose axis. In some examples, the second inner protective and structural woven reinforcing layer is within the first outer protective and structural woven reinforcing layer.

Inner reinforcing layer 115 may also comprise a second highly heat resistant warp yarn, wherein each strand is oriented parallel to a longitudinal hose axis. Inner reinforcing layer 115 may also comprise a second highly heat resistant weft yarn, wherein each strand is oriented circumferentially or helically relative to the longitudinal hose axis. In some examples, said second inner protective and structural woven reinforcing layer comprises a polymer-based material formulation. In some examples, said polymer-based material formulation includes a flame resistant, a flame retardant, or an intumescent material. In some examples, said polymer-based material formulation includes a reflective pigment. Inner reinforcing layer 115 may be an example of, or include aspects of, the corresponding elements described with reference to FIG. 2.

Intermediate layer 120 may be interposed between the first outer protective and structural woven reinforcing layer and the second inner protective and structural woven reinforcing layer, the intermediate layer 120 comprising a fabric laminated with a reflective material. In some examples, said intermediate layer 120 comprises a reflective foil. In some examples, said intermediate layer 120 comprises a tubular woven structure. In some examples, said intermediate layer 120 comprises a flat woven structure formed into a tube and stitched with a sewn seam running along the length of the tube. In some examples, said intermediate layer 120 comprises a flat non-woven structure formed into a tube and stitched with a sewn seam running along the length of the tube. Intermediate layer 120 may be an example of, or include aspects of, the corresponding elements described with reference to FIG. 2.

Outer reinforcing layer 125 may be an example of a first outer protective and structural woven reinforcing layer comprising a first tubular fabric structure. Outer reinforcing layer 125 may also comprise a first polyester or nylon warp yarn construction, wherein each strand is oriented parallel to a longitudinal hose axis. Outer reinforcing layer 125 may comprise a first polyester or nylon weft yarn construction, wherein each strand is oriented circumferentially or helically relative to the longitudinal hose axis. In some examples, said first outer protective and structural woven reinforcing layer comprises a tell-tale failure point indicator. In some examples, said first polyester or nylon warp yarn comprises a DREF yarn. In some examples, said first polyester or nylon weft yarn comprises the DREF yarn.

In some examples, said first outer protective and structural woven reinforcing layer comprises a tell-tale failure point indicator. In some examples, said first polyester or nylon weft yarn comprises an increased denier at said folding portions. In some examples, said first outer protective and structural woven reinforcing layer comprises a polymer-based material formulation. In some examples, said polymer-based material formulation includes a flame resistant, a flame retardant, or an intumescent material. In some examples, said polymer-based material formulation includes a temperature sensitive thermo-chromatic pigment. In some examples, said polymer-based material formulation includes a reflective pigment. In some examples, said polymer-based material formulation includes a photo-luminescent pigment. In some examples, said polymer-based material formulation includes retro-reflective pigment.

Outer reinforcing layer 125 may comprise a first highly heat resistant warp yarn, wherein each strand is oriented parallel to a longitudinal hose axis. Outer reinforcing layer 125 may also comprise a first highly heat resistant weft yarn, wherein each strand is oriented circumferentially or helically relative to the longitudinal hose axis. Outer reinforcing layer 125 may be an example of, or include aspects of, the corresponding elements described with reference to FIG. 2.

Figure 2:
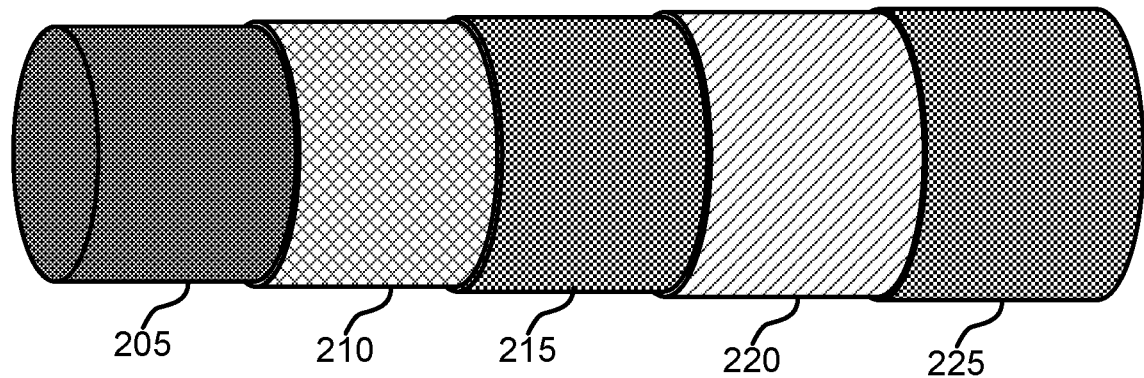
FIG. 2 shows an example of a hose with a rubber innermost layer in accordance with aspects of the present disclosure.
Figure 2:
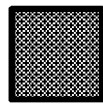
Figure 2:
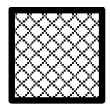
Figure 2:
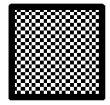
Figure 2:

FIG. 2 shows an example of a hose 200 with a rubber innermost layer 205 in accordance with aspects of the present disclosure. Hose 200 may include innermost layer 205, adhesive or bonding layer 210, inner reinforcing layer 215, intermediate layer 220, and outer reinforcing layer 225. Hose 200 and its constituent parts may be an example of, or include aspects of, the corresponding elements described with reference to FIG. 1. However, hose 200 of FIG. 2 illustrates an example in which the innermost layer 205 is made of rubber instead of TPU (as in FIG. 1). Other suitable materials may also be used for innermost layer 205 and other layers of hose 200.

Figure 3:
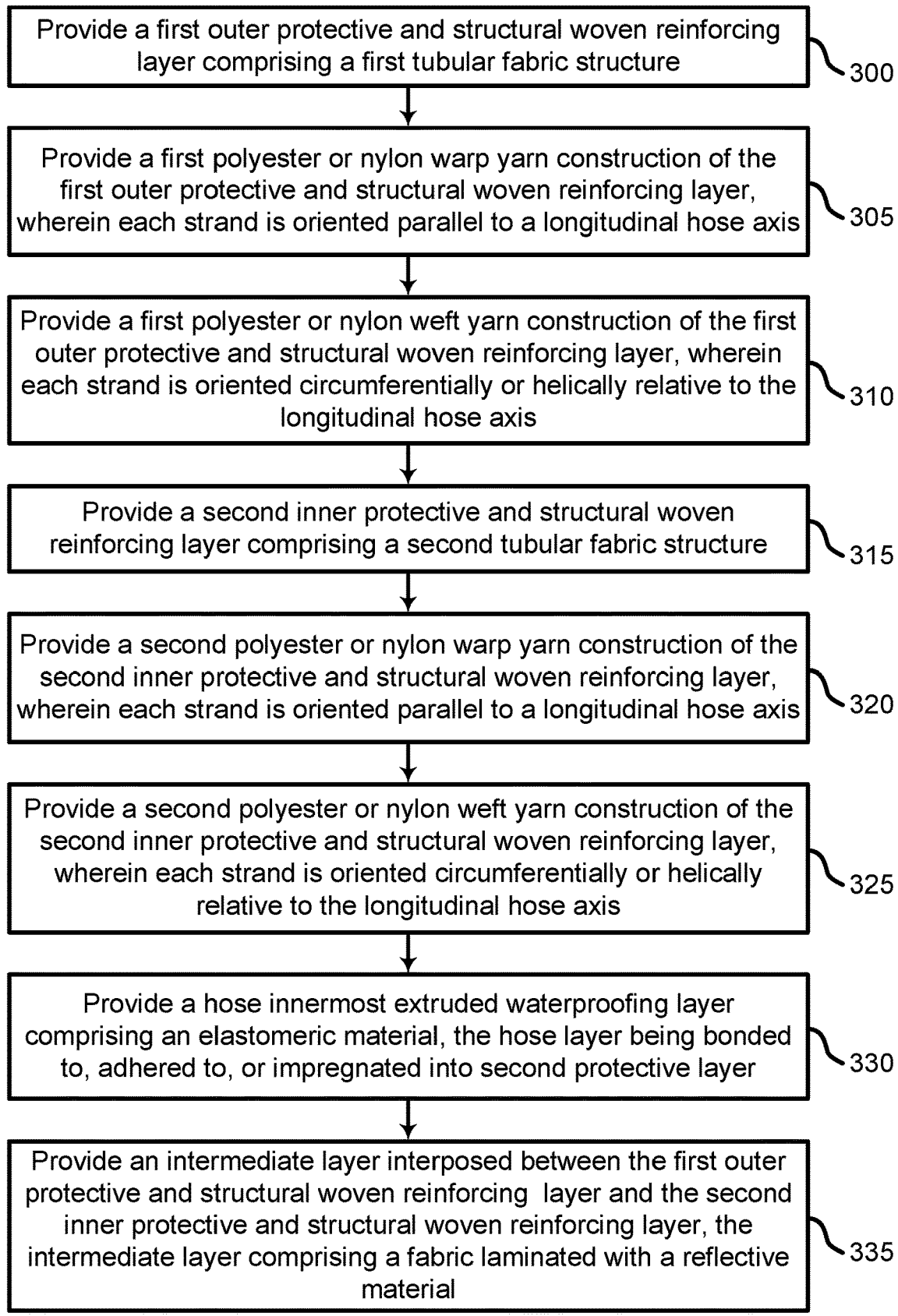
FIGS. 3 through 5 show examples of a process for producing a heat resistant hose in accordance with aspects of the present disclosure.

FIG. 3 shows an example of a process for producing a heat resistant hose in accordance with aspects of the present disclosure. In some examples, these operations may be performed by a manufacturing system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 300, the system may provide a first outer protective and structural woven reinforcing layer comprising a first tubular fabric structure. In some cases, the operations of this step may refer to an outer reinforcing layer as described with reference to FIGS. 1 and 2.

At step 305, the system may provide a first polyester or nylon warp yarn construction of the first outer protective and structural woven reinforcing layer, wherein each strand is oriented parallel to a longitudinal hose axis. In some cases, the operations of this step may refer to an outer reinforcing layer as described with reference to FIGS. 1 and 2.

At step 310, the system may provide a first polyester or nylon weft yarn construction of the first outer protective and structural woven reinforcing layer, wherein each strand is oriented circumferentially or helically relative to the longitudinal hose axis. In some cases, the operations of this step may refer to an outer reinforcing layer as described with reference to FIGS. 1 and 2.

At step 315, the system may provide a second inner protective and structural woven reinforcing layer comprising a second tubular fabric structure comprising. In some cases, the operations of this step may refer to an inner reinforcing layer as described with reference to FIGS. 1 and 2.

At step 320, the system may provide a second polyester or nylon warp yarn construction of the second inner protective and structural woven reinforcing layer, wherein each strand is oriented parallel to a longitudinal hose axis. In some cases, the operations of this step may refer to an inner reinforcing layer as described with reference to FIGS. 1 and 2.

At step 325, the system may provide a second polyester or nylon weft yarn construction of the second inner protective and structural woven reinforcing layer, wherein each strand is oriented circumferentially or helically relative to the longitudinal hose axis. In some cases, the operations of this step may refer to an inner reinforcing layer as described with reference to FIGS. 1 and 2.

At step 330, the system may provide a hose innermost extruded waterproofing layer comprising an elastomeric material, the hose layer being bonded to, adhered to, or impregnated into or through the second protective layer. In some cases, the operations of this step may refer to an innermost layer as described with reference to FIGS. 1 and 2.

At step 335, the system may provide an intermediate layer interposed between the first outer protective and structural woven reinforcing layer and the second inner protective and structural woven reinforcing layer, the intermediate layer comprising a fabric laminated with a reflective material. In some cases, the operations of this step may refer to an intermediate layer as described with reference to FIGS. 1 and 2.

Figure 4:
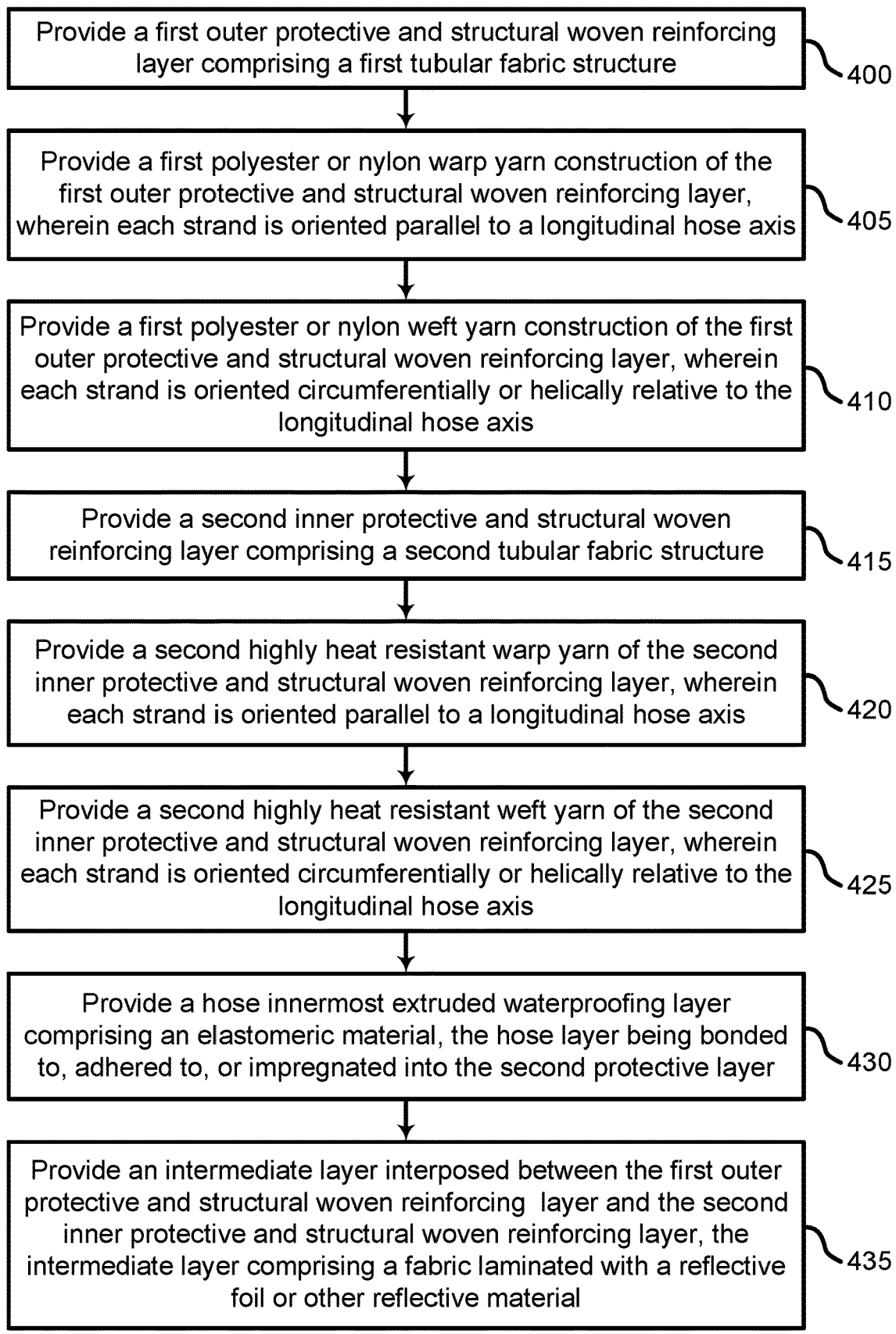

FIG. 4 shows an example of a process for producing a heat resistant hose in accordance with aspects of the present disclosure. In some examples, these operations may be performed by a manufacturing system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 400, the system may provide a first outer protective and structural woven reinforcing layer comprising a first tubular fabric structure.

At step 405, the system may provide a first polyester or nylon warp yarn construction of the first outer protective and structural woven reinforcing layer, wherein each strand is oriented parallel to a longitudinal hose axis.

At step 410, the system may provide a first polyester or nylon weft yarn construction of the first outer protective and structural woven reinforcing layer, wherein each strand is oriented circumferentially or helically relative to the longitudinal hose axis.

At step 415, the system may provide a second inner protective and structural woven reinforcing layer comprising a second tubular fabric structure comprising.

At step 420, the system may provide a second highly heat resistant warp yarn of the second inner protective and structural woven reinforcing layer, wherein each strand is oriented parallel to a longitudinal hose axis. In some cases, the operations of this step may refer to an inner reinforcing layer as described with reference to FIGS. 1 and 2.

At step 425, the system may provide a second highly heat resistant weft yarn of the second inner protective and structural woven reinforcing layer, wherein each strand is oriented circumferentially or helically relative to the longitudinal hose axis. In some cases, the operations of this step may refer to an inner reinforcing layer as described with reference to FIGS. 1 and 2.

At step 430, the system may provide a hose innermost extruded waterproofing layer comprising an elastomeric material, the hose layer being bonded to, adhered to, or impregnated into or through the second protective layer.

At step 435, the system may provide an intermediate layer interposed between the first outer protective and structural woven reinforcing layer and the second inner protective and structural woven reinforcing layer, the intermediate layer comprising a fabric laminated with a reflective foil or other reflective material.

Figure 5:
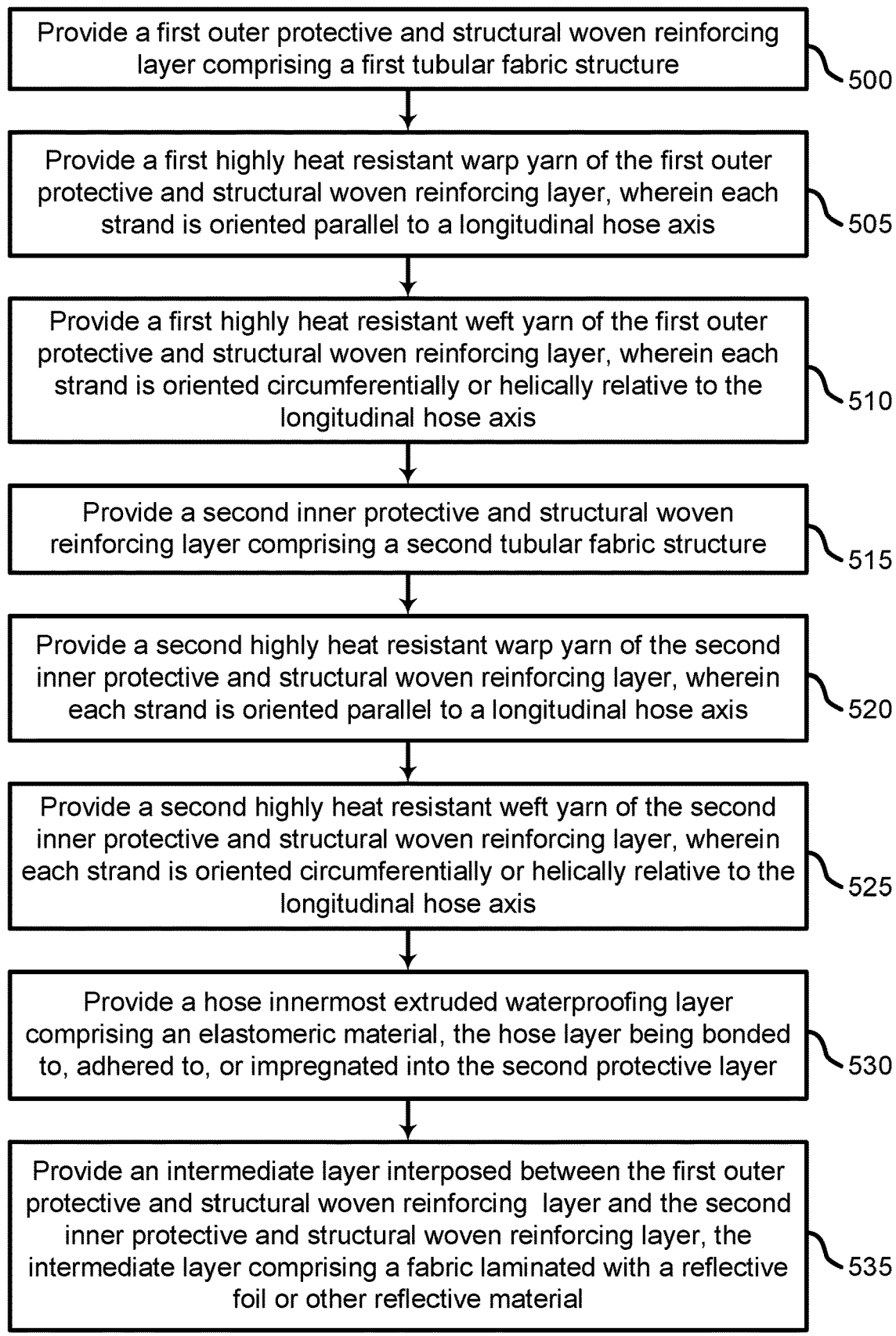

FIG. 5 shows an example of a process for producing a heat resistant hose in accordance with aspects of the present disclosure. In some examples, these operations may be performed by a manufacturing system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system may provide a first outer protective and structural woven reinforcing layer comprising a first tubular fabric structure.

At step 505, the system may provide a first highly heat resistant warp yarn of the first outer protective and structural woven reinforcing layer, wherein each strand is oriented parallel to a longitudinal hose axis. In some cases, the operations of this step may refer to an outer reinforcing layer as described with reference to FIGS. 1 and 2.

At step 510, the system may provide a first highly heat resistant weft yarn of the first outer protective and structural woven reinforcing layer, wherein each strand is oriented circumferentially or helically relative to the longitudinal hose axis. In some cases, the operations of this step may refer to an outer reinforcing layer as described with reference to FIGS. 1 and 2.

At step 515, the system may provide a second inner protective and structural woven reinforcing layer comprising a second tubular fabric structure comprising.

At step 520, the system may provide a second highly heat resistant warp yarn of the second inner protective and structural woven reinforcing layer, wherein each strand is oriented parallel to a longitudinal hose axis.

At step 525, the system may provide a second highly heat resistant weft yarn of the second inner protective and structural woven reinforcing layer, wherein each strand is oriented circumferentially or helically relative to the longitudinal hose axis.

At step 530, the system may provide a hose innermost extruded waterproofing layer comprising an elastomeric material, the hose layer being bonded to, adhered to, or impregnated into or through the second protective layer.

At step 535, the system may provide an intermediate layer interposed between the first outer protective and structural woven reinforcing layer and the second inner protective and structural woven reinforcing layer, the intermediate layer comprising a fabric laminated with a reflective foil or other reflective material.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A heat resistant hose, comprising:
a first outer protective and structural woven reinforcing layer comprising a first tubular fabric structure comprising:
a first highly heat resistant polyester or nylon warp yarn wherein each strand is oriented parallel to a longitudinal hose axis; and
a first highly heat resistant polyester or nylon weft yarn wherein each strand is oriented circumferentially or helically relative to the longitudinal hose axis;
a second inner protective and structural woven reinforcing layer comprising a second tubular fabric structure comprising:
a second highly heat resistant polyester or nylon warp yarn wherein each strand is oriented parallel to a longitudinal hose axis; and
a second highly heat resistant polyester or nylon weft yarn wherein each strand is oriented circumferentially or helically relative to the longitudinal hose axis;
wherein the second protective layer is within the first protective layer;
the hose further comprising an innermost extruded waterproofing layer comprising an elastomeric material, the innermost extruded waterproofing layer being bonded to, adhered to, or impregnated into the second protective layer;
wherein the innermost extruded waterproofing layer is within the inner protective and structural woven reinforcing layer; and
an intermediate layer interposed between the first outer protective and structural woven reinforcing layer and the second inner protective and structural woven reinforcing layer, the intermediate layer comprising a fabric laminated with a reflective material.

2. The hose of claim 1, wherein said intermediate layer comprises said reflective material comprising a reflective foil.

3. The hose of claim 1 wherein said first outer protective and structural woven reinforcing layer comprises a tell-tale failure point indicator.

4. The hose of claim 1 wherein said first polyester or nylon weft yarn comprises strands that are wrapped in a wrapping yarn.

5. The hose of claim 4 wherein said wrapping yarn is a DREF yarn.

6. The hose of claim 4 wherein said wrapping yarn is a yarn other than a DREF yarn.

7. The hose of claim 4 wherein said first polyester or nylon warp yarn comprises strands that are wrapped in the wrapping yarn.

8. The hose of claim 7 wherein said wrapping yarn is a DREF yarn.

9. The hose of claim 7 wherein said wrapping yarn is a yarn other than a DREF yarn.

10. The hose of claim 1 comprising a pair of longitudinal folding portions running the length of the heat resistant hose.

11. The hose of claim 10 comprising additional composite yarn or DREF yarn at said folding portions.

12. The hose of claim 10 comprising an elastomeric waterproofing material at said folding portions.

13. The hose of claim 1 wherein said first outer protective and structural woven reinforcing layer comprises a polymer-based material formulation.

14. The hose of claim 13 wherein said polymer-based material formulation includes a flame resistant, a flame retardant, or an intumescent material.

15. The hose of claim 14 wherein said polymer-based material formulation includes a temperature sensitive thermo-chromatic pigment.

16. The hose of claim 13 wherein said polymer-based material formulation includes a reflective pigment.

17. The hose of claim 13 wherein said polymer-based material formulation includes a photo-luminescent pigment.

18. The hose of claim 13 wherein said polymer-based material formulation includes retro-reflective pigment.

19. The hose of claim 1 wherein said second inner protective and structural woven reinforcing layer comprises a polymer-based material formulation.

20. The hose of claim 19 wherein said polymer-based material formulation includes a flame resistant, a flame retardant, or an intumescent material.

21. The hose of claim 19 wherein said polymer-based material formulation includes a reflective pigment.

22. A method of manufacturing a hose, the method comprising:
providing a first outer protective and structural woven reinforcing layer comprising a first tubular fabric structure;
providing a first highly heat resistant warp yarn of the first outer protective and structural woven reinforcing layer, wherein each strand is oriented parallel to a longitudinal hose axis;
providing a first highly heat resistant weft yarn of the first outer protective and structural woven reinforcing layer, wherein each strand is oriented circumferentially or helically relative to the longitudinal hose axis;
providing a second inner protective and structural woven reinforcing layer comprising a second tubular fabric structure;
providing a second highly heat resistant warp yarn of the second inner protective and structural woven reinforcing layer, wherein each strand is oriented parallel to a longitudinal hose axis;
providing a second highly heat resistant weft yarn of the second inner protective and structural woven reinforcing layer, wherein each strand is oriented circumferentially or helically relative to the longitudinal hose axis;

wherein the second inner protective and structural woven reinforcing layer is within the first outer protective and structural woven reinforcing layer;

the method further comprising providing an innermost extruded waterproofing layer comprising an elastomeric material, the innermost extruded waterproofing layer being bonded to, adhered to, or impregnated into or through the second protective layer;

wherein the innermost extruded waterproofing layer is within the inner protective and structural woven reinforcing layer; and the method further comprising providing an intermediate layer interposed between the first outer protective and structural woven reinforcing layer and the second inner protective and structural woven reinforcing layer, the intermediate layer comprising a fabric laminated with a reflective material.

\* \* \* \* \*